(12) United States Patent
Kim (10) Patent No.: US 7,345,997 B2
(45) Date of Patent: Mar. 18, 2008

(54) PACKET CALL ROUTING IN A MOBILE COMMUNICATION NETWORK

(75) Inventor: Tae Yong Kim, Suwon-shi (KR)

(73) Assignee: LG Electronics, Inc., Seoul (KR)

( * ) Notice: Subject to any disclaimer, the term of this patent is extended or adjusted under 35 U.S.C. 154(b) by 1271 days.

(21) Appl. No.: 10/236,964

(22) Filed: Sep. 9, 2002

(65) Prior Publication Data

US 2003/0048789 A1 Mar. 13, 2003

(30) Foreign Application Priority Data

Sep. 10, 2001 (KR) ................................ 2001-55429

(51) Int. Cl.
*H04J 1/16* (2006.01)

(52) U.S. Cl. ................ 370/230; 370/395.52; 370/338; 370/467; 379/220.01

(58) Field of Classification Search ............. 370/395.2, 370/230, 395.52, 338, 467; 379/221.01
See application file for complete search history.

(56) References Cited

U.S. PATENT DOCUMENTS 5,521,917 A * 5/1996 Watanabe et al. ........... 370/399
6,574,221 B1 * 6/2003 Petersen ................... 370/395.1
6,760,344 B2 * 7/2004 Mizell et al. ............... 370/475
7,027,825 B2 * 4/2006 Mizell et al. ............... 455/466
7,123,920 B1 * 10/2006 Faccin et al. ............... 455/450

* cited by examiner

*Primary Examiner*—Chirag G. Shah
*Assistant Examiner*—DeWanda Samuel
(74) *Attorney, Agent, or Firm*—Ked & Associates, LLP (57) ABSTRACT

The present invention relates to a method of call setup using packet call fixed routing in SGSN of mobile communication network which makes it possible to set up a packet call fixed route appropriate for the packet call satisfying Section 23.060 of the 3GPP standard. The present invention checks validity of resource information inputted from an operator if packet call fixed routing is requested by the operator and designates the resource as the resource for packet call fixed routing by transmitting resource information inputted from the operator to a processor that processes the call and a processor that administrates if the relevant resource is valid. The present invention makes it possible to set up a fixed route appropriate for the packet call satisfying Section 23.060 of the 3GPP standard by performing call setup using the resource designated for packet call fixed routing if packet call setup is requested by the operator. Also, the present invention makes it possible to set up a fixed route appropriate for the packet call between terminals, satisfying Section 23.060 of the 3GPP standard without altering the relevant function.

15 Claims, 5 Drawing Sheets

PACKET CALL ROUTING IN A MOBILE COMMUNICATION NETWORK

BACKGROUND OF THE INVENTION

1. Field of the Invention

The present invention generally relates to wireless communications. Particularly, the present invention may be applicable to third generation (3G) cellular phones.

2. Background of the Related Art

Mobile radio communication systems are used in everyday life. Garage door openers, remote controllers for home entertainment equipment, cordless telephones, hand-held walkie-talkies, pagers, and cellular telephones are all examples of mobile radio communication systems. Cellular radio systems provide high quality service that is often comparable to that of a landline telephone system. Over time, cellular radio systems have continued to evolve. In fact, third generation wireless networks (often referred to as 3G) are currently being developed. One goal of 3G wireless networks to for "cellular phones" to have both voice and data capabilities (such as internet browsing capabilities).

However, basic call process or generation of switching systems change due to technical development and subscribers' demands. As wireless networks develop, new protocols and hardware for setting up calls between a mobile terminal and the Internet are needed. For example, the adoption of section 23.060 of the $3^{rd}$ Generation Partnership Project (3GPP) standard requires a new method of packet call fixed routing. This new method is necessary because it is impossible to set up packet call fixed routing in IMT-2000 SGSN by using the standard of SGSN of the first, the second or the second and a half generation wireless networks.

SUMMARY OF THE INVENTION

An object of the invention is to solve at least the above problems and/or disadvantages and to provide at least the advantages described hereinafter. Embodiments of the present invention relate to a method and apparatus for receiving a request including resource information and an address and then concurrently processing the resource information and the address. The request may be a packet call fixed routing request and the address may be a mobile terminal number. The resource information may be at least one of a virtual path identifier, virtual connection identifier, a synchronous transfer mode management assembly, port number, and fast ethernet card number.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Embodiments of the present invention relate to a method of call setup using packet call routing in Serving General Packet Radio Service (GPRS) Support Node (SGSN) of a mobile communication network. Other embodiments relate to a method of call setup using packet call routing in SGSN of mobile communication network that may set up a packet call fixed route appropriate for that packet call satisfying 23.060 standard of 3 Generation Partnership Project (GPP).

Figure 1:
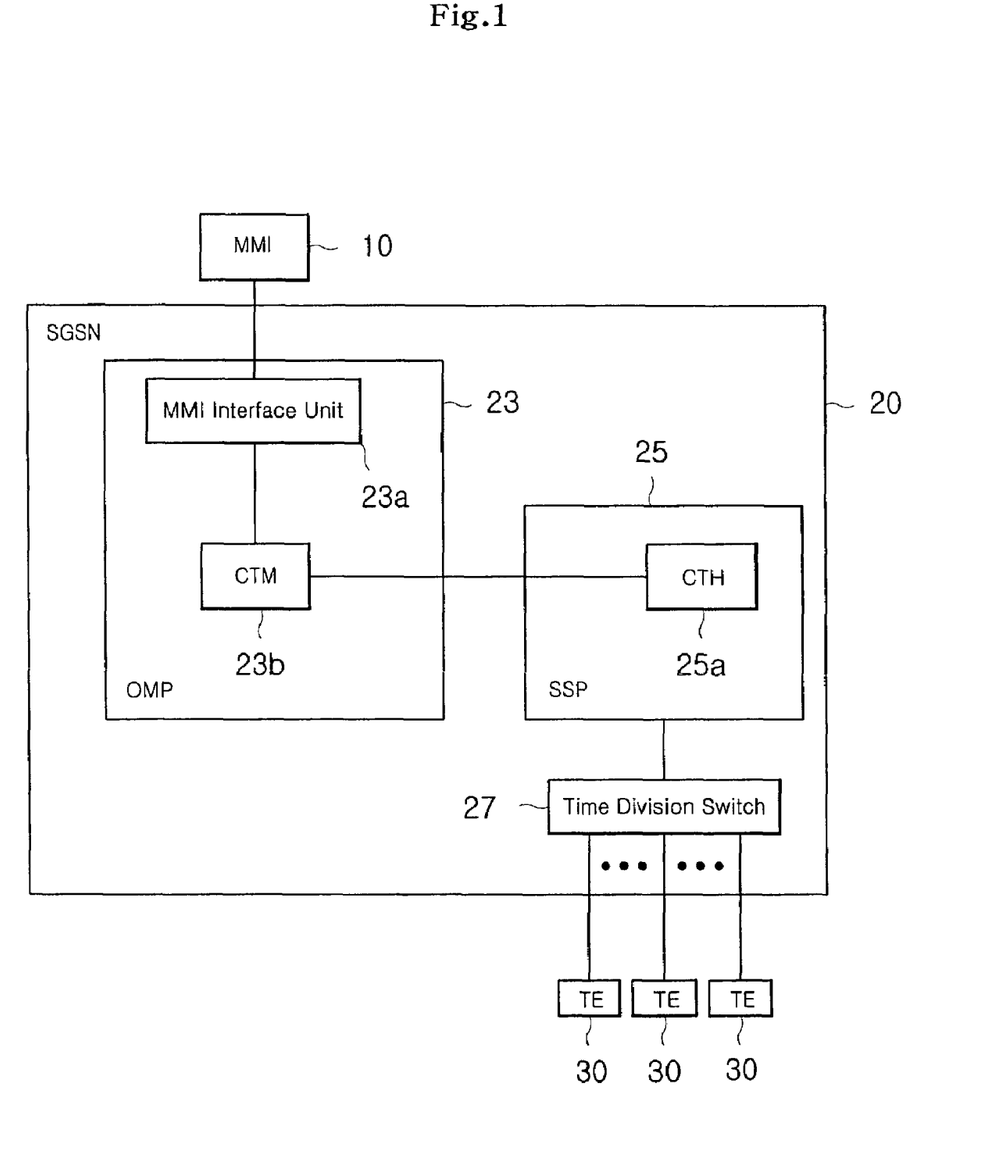
FIG. 1 illustrates the structure of a SGSN.

As illustrated in FIG. 1, SGSN comprises Operation and Maintenance Processor (OMP) (23), Subscriber Service Processor (SSP) (25) and Time Division Switch (T-Switch) (27). OMP (23) comprises Man Machine Interface (MMI) unit (23*a*) and Call Trace Management (CTM) (23*b*). OMP (23) performs operation and maintenance of SGSN (20) upon receiving operator's instruction. The MMI unit (23*a*) receives the operator's instruction from a Man Machine Interface (MMI) (10). MMI (10) receives the operator's instruction and transmits the instruction to SGSN (20). CTM (23*b*) transmits a signal that requests fixed routing to SSP (25), which accommodates the subscriber who receives routing request, according to the fixed routing request that is received through MMI unit (23*a*) from the operator.

SSP (25) is a processor that processes a call and includes a Call Trace Handler (CTH) (25*a*). CTH (25*a*) receives a signal requesting fixed routing, transmitted from CTM (23*b*) of OMP (23). T-Switch (27) performs the function of switching each call to Terminal Equipments (TEs) connected to the T-Switch (27). In exemplary second generation wire network Integrated Services Digital Network (ISDN) and in the second and a half generation network Personal Communication System (PCS), all fixed routing tasks, except input /or output through MMI (10), are performed by SSP (25) and T-switch (27).

Figure 2:
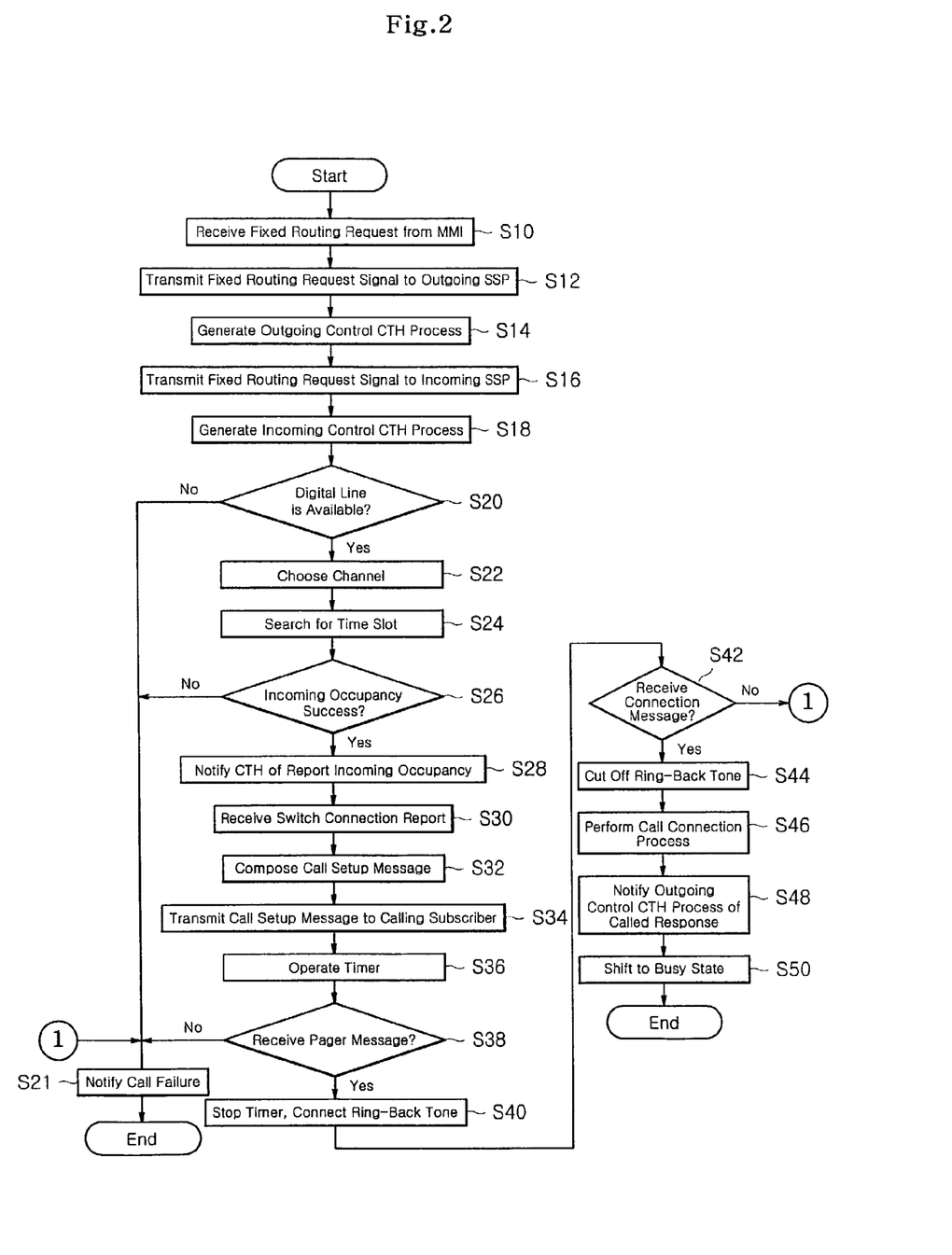
FIG. 2 is a flow chart illustrating a method of fixed routing in the SGSN.

FIG. 2 illustrates embodiments of the present invention relating to a method of fixed routing in a SGSN. In steps S10 and S12, if SGSN receives a fixed routing request for a subscriber through MMI unit (23*a*) from MMI (10), CTM (23*b*) of OMP (23) transmits signal requesting fixed routing to SSP (25), which accommodates the calling subscriber who requested the fixed routing (Hereinafter, "Outgoing SSP"). CTH (25*a*) of the Outgoing SSP (25), that receives signal that requesting fixed routing from CTM (23*b*) of OMP (23) generates an outgoing control CTH process according to the fixed routing request of CTM (23*b*).

In steps S14 and S16, the outgoing control CTH process transmits, for occupancy request of the called subscriber, occupancy request signal to CTH of SSP which accommodates the called digital subscriber (Hereinafter, 'Incoming SSP'). In step S18, CTH, of the Incoming SSP that has received the incoming occupancy request signal from the outgoing control CTH process at step S16 incoming SSP, generates an incoming control CTH process for the incoming signal routing. In step S20, the incoming control CTH process generated by CTH of the Incoming SSP at the step S18 determines whether the digital line is available.

In steps S21, S22, and S24, if the digital line is determined to be not available, the incoming control CTH process notifies CTM that call setup has failed. If the digital line is available, the incoming control CTH process chooses available channel and searches for the relevant time slot. In steps S26 and S28, if the call setup message is composed and the incoming occupancy is performed successfully, signal notifying the incoming occupancy is transmitted to CTH of the Incoming SSP. In steps S30, S32, S34, and S36, if the calling subscriber call setup is completed and signal notifying the switch connection is received from the outgoing control CTH process connected to T-Switch (27), then the incoming control CTH process composes a call setup message, transmits the composed call setup message to the called digital subscriber, operates a timer in order to monitor messages received from the called digital subscriber and shifts to the call setup step.

In steps S38 and S40, if a pager message is received from the called digital subscriber, who received the call setup message at the step S34, then the operation of the timer is stopped and the ring-back tone is connected. If the incoming control CTH process receives a connection message from the called terminal (Step S42), then the provided ring-back tone is cut off (Step S44), a call connection process is performed (Step S46), signal notifying the called response is transmitted to the outgoing control CTH process (Step S48), and the system is shifted to busy condition (Step S50).

Figure 3:
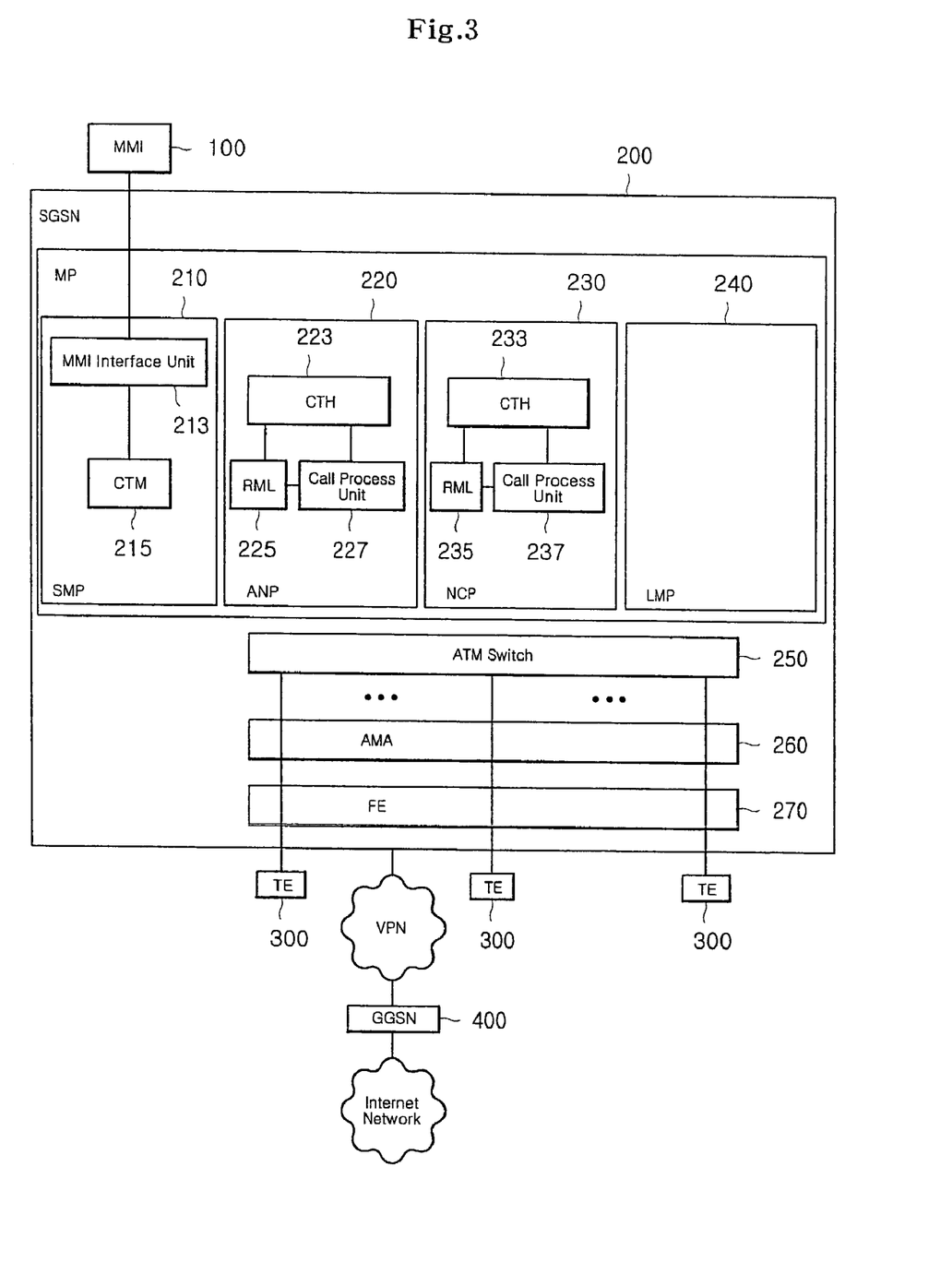
FIG. 3 illustrates the structure of an IMT-2000 SGSN to which the method of call setup using packet call fixed routing.

A detailed explanation will be given with references to FIGS. 3 to 5 to illustrate a method of call setup using packet call fixed routing in SGSN of mobile communication network in accordance with embodiments of the present invention. IMT-2000 SGSN to which the method of call setup using packet call fixed routing according to embodiments of the present invention is applied comprises System Management Processor (SSP) (210), Access Network Processor (ANP) (220), Network Control Processor (NCP) (230), Location Management Processor (LMP) (240), ATM switch (250), ATM Management Assembly (AMA) (260) and Fast Ethernet (FE) (270), as illustrated in FIG. 3.

SSP (210) comprises MMI unit (213) and CTM (215), and receives the operator's instruction and performs operation and maintenance of SGSN (200). The MMI unit (213) receives a packet call fixed routing request including resource information needed for packet call setup from MMI (100) that receives an instruction from the operator and transmits the instruction to SGSN (200). CTM (215) checks validity of resource information needed for packet call setup inputted from the operator through MMI unit (213) and transmits fixed routing request signal to a Main Processor (MP) equipped with the relevant AMA. ANP (220), NCP (230) and LMP (240) are processors that process the call relating to the third generation network IMT-2000. ANP (220) processes the call at the subscriber part and NCP (230) processes the at the network part. LMP (240) processes location information of subscribers.

ANP (220) and NCP (230) respectively comprise Resource Management Library (RML) (225, 235) for the ATM resource administration, call process unit (227, 237) for processing the basic call according to 23.060 standard of 3GPP and CTH (223, 233) for receiving fixed routing request signal transmitted from CTM (215) of SSP (210) and transmitting data for packet call fixed routing to RML (225, 235) and the call process unit (227, 237).

ATM switch (250) performs switching of the switching system call by exchanging ATM cells and a number of Terminal Equipments (TE) (300) are connected to the ATM switch (250). AMA (260) administrates ports of the ATM switch (250). FE (270) is a Transmission Control Protocol/Internet Protocol (TCP/IP) interface card and exists at the lower layer of AMA (260) for interface with packet calls. Gateway GPRS Support Node (SGSN) (400) is connected to SGSN (200) through Virtual Private Network (VPN) for transmitting calls transferred from SGSN (200) into the Internet network.

Figure 4:
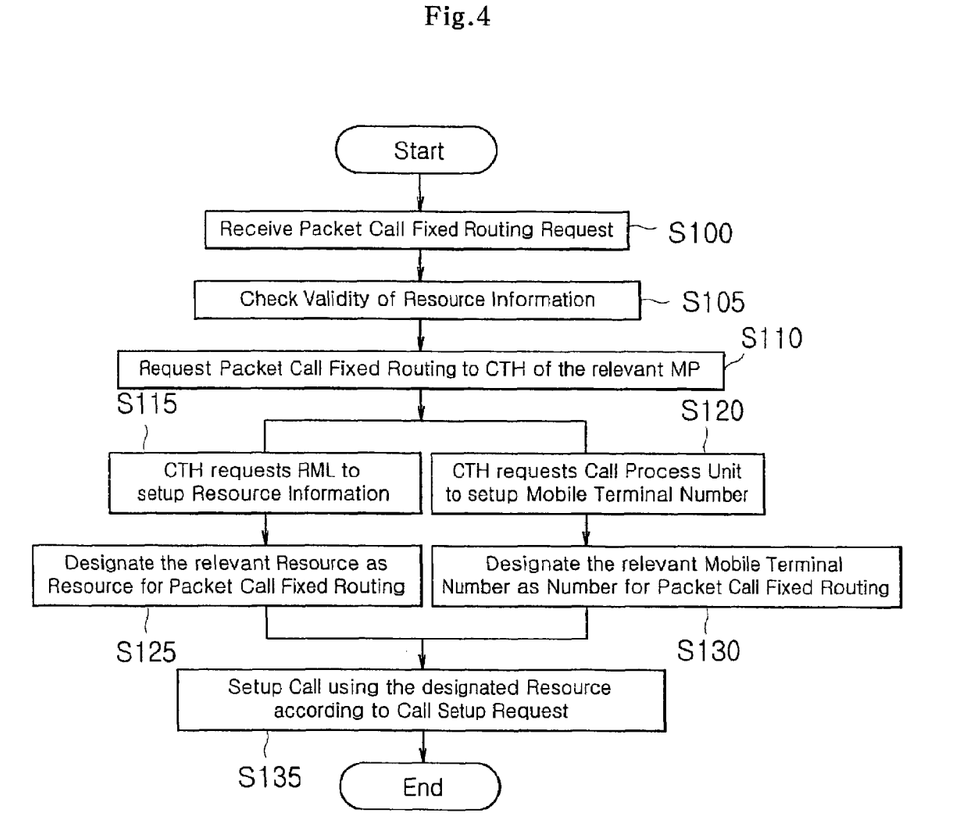
FIG. 4 is a flow chart illustrating the method of call setup using packet call fixed routing in a SGSN.

FIG. 4 illustrates an exemplary method of call setup using packet call fixed routing in IMT-2000 SGSN according to embodiments of the present invention. In steps S100 an S105, if a packet call fixed routing request is received from an operator, it is checked whether resource information needed for packet call fixed routing is valid or not. If the resource information is determined to be valid upon the checking at the step S105, a request for the packet call fixed routing is transmitted to CTH of MP controlling resource information (Step S100). In step S115, CTH, which is requested to set up a call fixed route at the step S110, requests the resource information setup by transmitting all resource information except the mobile terminal number to RML administrating resource. In step S120, CTH requests the mobile terminal number setup by transmitting the mobile terminal number to the call process unit that processes the call.

In step S125, RML, which is requested by CTH to set up resource information according to the resource information setup request at the step S115, designates the relevant resource as the resource for packet call fixed routing on the basis of the resource information transmitted from CTH. In step S130, the call process unit designates the mobile terminal number transmitted from CTH as the number for packet call fixed routing according to the mobile terminal number setup request made at the step S120. In step S135, if a call setup is requested by the mobile terminal having the mobile terminal number designated for packet call fixed routing, the call setup is performed by using the resource designated for packet call fixed routing.

Figure 5:
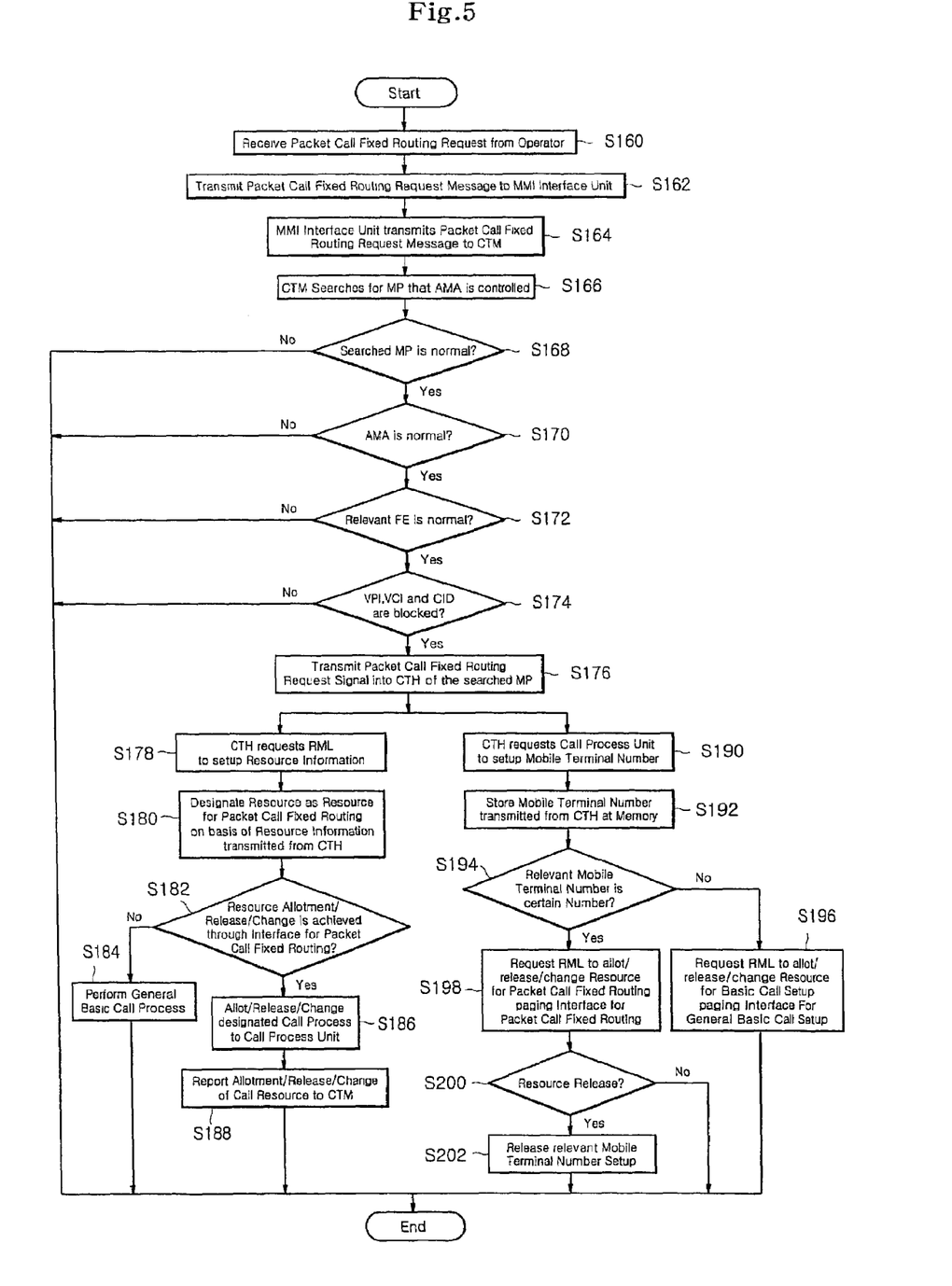
FIG. 5 is a flow chart illustrating the method of call setup using packet call fixed routing in an SGSN.

FIG. 5 illustrates a method of call setup using packet call fixed routing in SGSN of mobile communication network according to embodiments of the present invention. In step S160, MMI (100) receives a packet call fixed routing request including resource information needed for packet call fixed routing from an operator. When requesting the packet call fixed routing, the operator may input mobile terminal number, VPI, VCI, CID, AMA number, port number and FE card number. Among these items of information, the operator may input mobile terminal number and at least one among VPI, VCI, CID, AMA number, port number and FE card number.

In step S162, MMI (100), which has received from the operator a request to set up a packet call fixed route at the step S160, transmits a packet call fixed routing request message inputted from the operator into the MMI unit (213) of the switching system (200) using TCP/IP. In step S164, the MMI unit (213), which has received the packet call fixed routing request through TCP/IP from MMI (100), converts the packet call fixed routing request message of TCP/IP format transmitted from MMI (100) into the message of IPC format and transmits the converted message to CTM (215).

CTM (215), which has received the packet call fixed routing request message of IPC format from the MMI unit (213) at the step S164, determines whether the resource information included in the packet call fixed routing request message is valid or not. In step S166, CTM (215) searches for MP wherein the AMA relevant to AMA number, which is included in the packet call fixed routing request message, is controlled. In step S168, CTM (215) determines whether the searched MP (ANP or NCP exists as an MP controlling the relevant AMA) is in the normal condition.

In step S170, if it is determined that the searched MP is normal at the step S168, it is determined whether the condition of the AMA is normal. In step S172, if it is determined that the condition of the AMA is normal, it is determined whether the condition of FE corresponding to the FE card number included in the packet call fixed routing request message is normal. In step S174, if it is determined that the condition of the relevant FE is normal at the step S172, it is determined whether VPI, VCI and CID ports included in the packet call fixed routing request message are blocked.

The determination of whether VPI, VCI and CID port included in the packet call fixed routing request message are blocked or not is made by IPC with PMH (Port Management Handler; not shown in the attached drawings) which is included in all MP (SSP, ANP, NCP and LMP) and which administrates the condition of AMA (260) and FE (270). In other words, CTM (215) transmits VPI, VCI and CID included in the packet call fixed routing request message into PMH and PMH which has received VPI, VCI and CID from CTM (215) determines whether VPI, VCI and CID port transmitted from the CTM (215) are blocked or not based upon the condition administration information and transmits the determination result to CTM (215).

In step S176, if it is determined at the step S174 that VPI, VCI and CID ports included in the packet call fixed routing request message are blocked, CTM (215) requests the packet call fixed routing by transmitting packet call fixed routing request signal into CTH of MP searched at the step S166 in order to set up a packet call fixed route. CTH which has received packet call fixed routing request signal from CTM (215) transmits resource information for packet call fixed routing to RML and the call process unit which exist in MP to which CTM itself belongs. Instep S190, CTH requests RML to conduct the resource information setup by transmitting all resource information except the mobile terminal number by IPC (Step S178) and requests the call process unit to conduct the mobile phone number setup by transmitting the mobile terminal number by IPC.

In step S180, RML which has received all resource information except the mobile terminal number from CTH at the step S178, stores the resource information transmitted from CTH at a certain memory area and designates the relevant resource as the resource for packet call fixed routing. In step S192, the call process unit, which has received the mobile terminal number from CTH at the step S190, stores the transmitted mobile terminal number at the certain memory area and registers the relevant mobile terminal number as the number for packet call fixed routing.

If the setup of the resource and the mobile terminal number to be used for packet call fixed routing is completed, the operator attempts to set up a call by using the mobile terminal having the number inputted at the time of requesting the packet call fixed routing. In step S194, if the operator attempts to set up a call, the call process unit performing call process performs the call setup task according to Section 23.060 of the 3GPP standard and determines whether the number of the mobile terminal performing the current call setup is identical with the number registered for packet call fixed routing by the operator's packet call fixed routing request at the step S192. In the step S196, if it is determined that the number of the mobile terminal performing the current call setup is not identical with the number registered for packet call fixed routing, the interface for basic call setup/release/change is paged and a requested for allotment/release/change of resource needed for the basic call setup is sent to RML. Likewise, in the step S198, if it is determined that the number of the mobile terminal performing the current call setup is identical with the number registered for packet call fixed routing, the interface for packet call setup/release/change is paged and a request for allotment/release/change of resource needed for the packet call setup is sent to RML.

Because the call process unit uses interface for basic call setup/release/change or interface for packet call fixed route setup/release/change depending on the relevant number at the step S196 or at the step S198, overload may be caused or the call process performance may be degraded. However, because a packet call fixed route is set up in several minutes after receiving the operator's request of packet call fixed routing, the comparison for each call generating 13 digits number within the several minutes does not cause great overload. For example, where the call gapping per second is about 100, if it is assumed that packet call fixed routing is performed in 3 minutes, approximately 20,000 comparisons are required and thus the performance would not be degraded.

After a packet call fixed routing request is received from the operator, if the relevant call does not occur within a predetermined period of time, CTH requests through IPC that the relevant call process unit initialize the relevant number. The call process unit requested to initialize the relevant number from CTH initializes the relevant number and stops the comparison task. In step S182, RML requested to allot/release/change resource needed for packet call fixed routing from the call process unit at the step S196 or at the step S198 determines whether the allotment/release/change of resource requested from the call process unit is achieved through interface for setup/release/change of packet call fixed routing.

In step S184, upon the determination at the step S182, if the allotment/release/change of resource is determined to have been achieved not through interface for setup/release/change of packet call fixed route but through interface for setup/release/change of basic call, a general basic call process is performed in which resource for basic call setup is allotted and transmitted to the call process unit.

In step S186, upon the determination at the step S182, allotment/release/change of resource is determined to have been achieved through interface for setup/release/change of packet call fixed routing, the relevant call is recognized as a call for packet call fixed routing and the call resource designated for the resource for packet call fixed routing at the step S180 is allotted/released/changed to the call process unit that requested allotment/release/change of resource through interface for setup/release/change of packet call fixed routing. Thereafter, RML reports the call resource allotment/release/change to CTM (215). CTM (215) which has received the report on the call resource allotment/release/change from RML reports the moment of the resource allotment/release/change to operator. Thus, the operator is notified of the current condition (connection/release/change) of the call.

The call process unit, which had the resource needed for packet call fixed routing allotted/released/changed by RML at the step S186, sets up/releases/changes a packet call fixed route by using the relevant resource. In step S200, resource release is requested according to a packet call fixed route release request. In step S202, the mobile terminal number registered for packet call fixed routing at the step S192 is removed from the relevant memory area. The reason for initializing the database structure storing the information on the relevant mobile termination number as explained through the steps S200 and S202 is because packet call fixed routing may be performed only once after a packet call fixed routing request is received from the operator.

Embodiments of the present invention relate to a method of call setup using packet call fixed routing in SGSN of mobile communication network. The method may include the following steps. Checking whether resource information needed for setting up a packet call fixed route is valid. Processing fixed routing in parallel by processor that processes call and processor that administrates resource. Receiving at the MMI unit the input of a packet call fixed routing request message including the resource information needed for packet call fixed routing through TCP/IP from MMI which receives the operator's instruction. Converting the packet call fixed routing request message of the TCP/IP format into the message of the Inter Processor Communication (IPC) format and transmitting the converted packet call fixed routing request message of the IPC format to CTM. Checking at the CTM whether the resource information included in the packet call fixed routing request message is valid.

The step of checking whether resource information is valid may include the following steps. Searching for MP wherein the AMA corresponding to the AMA number is controlled and determining whether the searched MP is normal. Determining whether the AMA is in the normal condition if it is determined that the searched MP is normal. Determining whether the FE corresponding to the FE card number is in the normal condition if it is determined that the AMA's condition is normal. Determining whether VPI, VCI and CID ports are blocked if it is determined that the FE's condition is normal. The step of determining whether the VPI, VCI and CID ports are blocked is made by IPC with Port Management Handler (PMH) that administrates condition of every kind of port included in AMA and FE. The PMH which has received the VPI, VCI and CID from CTM determines whether the VPI, VCI and CID ports are blocked based upon the condition administration information and transmits the determination result to the CTM.

The step of setting up fixed route may include the following steps. Requesting the processor that administrates resource information to set up packet call fixed route. Requesting the relevant processor to setup and designate resource information according to the packet call fixed routing request. The processor that processes call and the processor that administrates resource may process fixed routing simultaneously. The step of setting up and designating resource information may include the following steps. Requesting mobile terminal number setup by transmitting mobile terminal number to processor that processes call according to the packet call fixed routing request and designating the mobile terminal number as the number for packet call fixed routing. Requesting resource information setup by transmitting resource information to processor that administrates resource and designating the resource information as the information for packet call fixed routing. The step of performing call setup uses the designated resource information.

Embodiments of the present invention relate to a method of call setup using packet call fixed routing in SGSN of mobile communication network and may include the following steps. Checking whether resource information needed for setting up a packet call fixed route is valid according to the operator's request of packet call fixed routing. Designating the resource information as the information for packet call fixed routing if the resource information is determined to be valid from the checking. Performing call setup using the designated resource. The resource information comprises mobile terminal number and hardware resource. The hardware resource comprises at least one of Virtual Path Identifier (VPI), Virtual Connection Identifier (VCI), Connection Identifier (CID), ATM Management Assembly (AMA), port number and Fast Ethernet (FE) card number.

The step of packet call fixed routing may include the following steps. Requesting a processor controlling the resource information to set up a packet call fixed route. Requesting the relevant processor to setup and designate resource information according to the packet call fixed routing request. The step of setting up and designating resource information, fixed routing is processed simultaneously at processor that processes call and processor that administrates resource according to the packet call fixed routing request.

The step of setting up and designating resource information may include the following steps. Requesting mobile terminal number setup by transmitting mobile terminal number to processor that processes call according to the packet call fixed routing request and designating the mobile terminal number as the number for packet call fixed routing. Requesting resource information setup by transmitting resource information to processor that administrates resource and designating the resource information as the information for packet call fixed routing.

Embodiments of the present invention relate to a method of call setup using packet call fixed routing in SGSN of mobile communication network. The method may include the following steps. Checking whether resource information needed for setting up a packet call fixed route is valid according to the operator's request of packet call fixed routing. Requesting CTH of Main Processor (MP) that controls the resource information to set up a packet call fixed route if the resource information is determined to be valid from the checking. Requesting the mobile terminal number setup by transmitting a mobile terminal number to the processor that processes the call process at the CTH and requesting the resource information setup by transmitting resource information except the mobile terminal number to the processor that administrates resource. Designating the resource as the resource for packet call fixed routing at the processor that administrates resource according to the resource information setup request. Designating the mobile terminal number as the number for packet call fixed routing at the processor that processes the call process according to the mobile terminal number setup request. Performing the call setup using the resource designated for the packet call fixed routing, if a call setup is requested through a mobile terminal which has the mobile terminal number. The resource information may comprise mobile terminal number and hardware resource. The hardware resource may comprise at least one of Virtual Path Identifier (VPI), Virtual Connection Identifier (VCI), Connection Identifier (CID), ATM Management Assembly (AMA), port number and Fast Ethernet (FE) card number.

The step of the checking may include the following steps. Receiving at the MMI unit the input of a packet call fixed routing request message including the resource information needed for packet call fixed routing through TCP/IP from MMI which receives the operator's instruction. Converting the packet call fixed routing request message of the TCP/IP format into the message of the Inter Processor Communication (IPC) format and transmitting the converted packet call fixed routing request message of the IPC format to CTM. Checking at the CTM whether the resource information included in the packet call fixed routing request message is valid.

The step of checking whether the resource information is valid may include the following steps. Searching for MP wherein the AMA corresponding to the AMA number is controlled and determining whether the searched MP is normal. Determining whether the AMA is in the normal condition if it is determined that the searched MP is normal. Determining whether the FE corresponding to the FE card number is in the normal condition if it is determined that the AMA's condition is normal. Determining whether VPI, VCI and CID ports are blocked if it is determined that the FE's condition is normal. The step of determining whether the VPI, VCI and CID ports are blocked is made by IPC with Port Management Handler (PMH) at administrates condition of every kind of port included in AMA and FE. The PMH which has received the VPI, VCI and CID from CTM determines whether the VPI, VCI and CID ports are blocked based upon the condition administration information and transmits the determination result to the CTM.

The step of performing the call setup may include the following steps. Determining, at the processor that processes the call, whether the number of the mobile terminal that requests a call setup is identical with the number of the mobile terminal designated for the packet call fixed routing if a call setup is requested. Requesting the processor that administrates resource to allot resource needed for the packet call setup by paging interface for the packet call fixed routing if the number of the mobile terminal is identical with the number of the mobile terminal designated for the packet call fixed routing. Allotting, at the processor that administrates resource, the resource designated for the packet call fixed routing to the processor that processes the call according to the resource allotment request. Performing, at the processor that processes the call, the call setup using the allotted resource.

If the number of the mobile terminal is not identical with the number of the mobile terminal designated for the packet call fixed routing, the step of performing the call setup further may include the following steps. Requesting the processor that administrates resource to allot resource needed for a basic call setup by paging interface for the basic call setup. Allotting, at the processor that administrates resource, resource for the basic call setup according to the resource allotment request and transmitting the resource for the basic call setup to the processor that processes the call. If a release of the setup packet call is requested, further comprising the step of releasing the setup packet call and the setup of the mobile terminal number designated for the packet call fixed routing.

As explained above, according to the method of call setup using packet call fixed routing in SGSN of mobile communication network of the present invention, it is possible to designate relevant resource as the resource for packet call fixed routing by transmitting resource information received from the operator to the processor that processes the call and the processor that administrates according to the packet call fixed routing request of the operator. Also, it is possible to set up a fixed route appropriate for packet call that meets Section 23.060 of the 3GPP standard by performing the call setup using the designated resource when the operator attempts to set up a packet call. Furthermore, it is possible to set up a fixed route appropriate for packet call between terminals satisfying Section 23.060 of the 3GPP standard without altering the relevant function.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of call setup using packet call fixed routing in SGSN of mobile communication network, comprising:
   checking whether resource information for setting up a packet call fixed route is valid; and
   processing fixed routing in parallel by a processor that processes a call and a processor that administrates one or more resources, wherein said checking comprises:
   receiving, at a man-machine interface (MMI) unit, a packet call fixed routing request message including the resource information for setting up the packet call fixed route, the message received from a man-machine interface (MMI) in response to an operator instruction and in TCP/IP format;
   converting the packet call fixed routing request message in TCP/IP format to an Inter Processor Communication (IPC) format:
   transmitting the converted packet call fixed routing request message in IPC format to a call trace manager (CTM); and
   checking whether the resource information in the packet call fixed routing request message is valid by:
   searching for a main processor (MP) which controls an ATM management assembly (AMA) that corresponds to an AMA number included in packet call fixed routing request message;
   determining whether the searched MP is in a normal condition;
   if it is determined that the searched MP is in said normal condition, then determining whether the AMA is in a normal condition;
   if it is determined that the AMA is in said normal condition, then determining whether a fast ethernet (FE) corresponding to an FE card number, included in the packet call fixed routing request message, is in a normal condition; and
   if it is determined that the FE is in said normal condition, then determining whether one or more of virtual path identifier (VPI), virtual connection identifier (VCI), or connection identifier (CID) ports are blocked.

2. The method of claim 1, wherein determining whether one or more of the VPI, VCI or CID ports are blocked is performed by inter processor communication (IPC) with a Port Management Handler (PMH) that administrates a condition of predetermined kinds of ports included in the AMA and FE.

3. The method of claim 2, wherein the PMH which has received the VPI, VCI and CID from CTM determines whether the VPI, VCJ and CID ports are blocked based upon condition administration information and transmits the determination result to the CTM.

4. The method of claim 1, wherein setting up fixed route comprises:
   requesting the processor that administrates said one or more resources to set up packet call fixed route; and
   requesting a processor to setup and designate resource information according to the packet call fixed routing request.

5. The method of claim 1, wherein the processor that processes call and the processor that administrates said one or more resources process fixed routing simultaneously.

6. The method of claim 4, wherein setting up and designating resource information comprises:
   requesting mobile terminal number setup by transmitting a mobile terminal number to a processor that processes the call according to the packet call fixed routing request;

designating the mobile terminal number as the number for packet call fixed routing;

requesting resource information setup by transmitting resource information to the processor that administrates said one or more resources; and designating the resource information as the information for packet call fixed routing.

7. The method of claim 1, further comprising: performing call setup using the resource information.

8. A method of call setup using packet call fixed routing in SGSN of mobile communication network, comprising:

checking whether resource information for setting up a packet call fixed route is valid according to an operator's request of packet call fixed routing;

requesting a call trace handler (CTH) of a Main Processor (MP) that controls the resource information to set up a packet call fixed route, if the resource information is determined to be valid from the checking;

requesting a mobile terminal number setup by transmitting a mobile terminal number to a processor that processes the call process at the CTH;

requesting a resource information setup by transmitting the resource information except the mobile terminal number to the processor that administrates a resource;

designating the resource as the resource for packet call fixed routing at the processor that administrates the resource according to the resource information setup request;

designating the mobile terminal number as the number for packet call fixed routing at the processor that processes the call process according to the mobile terminal number setup request; and performing the call setup using the resource designated for the packet call fixed routing, if a call setup is requested through a mobile terminal which has the mobile terminal number, wherein said checking comprises:

receiving, at a man-machine interface (MMI) unit. a packet call fixed routing request message including the resource information for setting up the packet call fixed route. the message received from a man-machine interface (MMI) in response to an operator instruction and in TCP/IP format;

converting the packet call fixed routing request message in TCP/IP format to an Inter Processor Communication (IPC) format;

transmitting the converted packet call fixed routing request message in IPC format to a call trace manager (CTM); and checking whether the resource information in the packet call fixed routing request message is valid by:

searching for a main processor (MP) which controls an ATM management assembly (AMA) that corresponds to an AMA number included in packet call fixed routing request message;

determining whether the searched MP is in a normal condition;

if it is determined that the searched MP is in said normal condition, then determining whether the AMA is in a normal condition;

if it is determined that the AMA is in said normal condition, then determining whether a fast ethernet (FE) corresponding to an FE card number. included in the packet call fixed routing request message, is in a normal condition; and if it is determined that the FE is in said normal condition, then determining whether one or more of virtual path identifier (VPI), virtual connection identifier (VCI), or connection identifier (CID) ports are blocked.

9. The method of claim 8, wherein the resource information comprises mobile terminal number and hardware resource.

10. The method of claim 9, wherein the hardware resource comprises at least one of Virtual Path Identifier (VPI), Virtual Connection Identifier (VCI), Connection Identifier (CID), ATM Management Assembly (AMA), port number and Fast Ethernet (FE) card number.

11. The method of claim 8, wherein determining whether one or more of the VPI, VCI or CID ports are blocked is performed by inter processor communication (IPC) with a Port Management Handler (PMH) that admiistrates a condition of predetermined kinds of ports included in the AMA and FE.

12. The method of claim 11, wherein the PMH which has received the VPI, VCI and CID from CTM determines whether the VPI, VCI and CID ports are blocked based upon die condition administration information and transmits the determination result to the CTM.

13. The method of claim 8, wherein performing the call setup comprises:

determining, at the processor that processes the call, whether the number of the mobile terminal that requests a call setup is identical with the number of the mobile terminal designated for the packet call fixed routing if a call setup is requested;

requesting the processor that admiistrates the resource to allot at least one resource for the packet call setup by paging interface for the packet call fixed routing, if the number of the mobile terminal is identical with the number of the mobile terminal designated for the packet call fixed routing;

allotting, at the processor that administrates the resource, the resource designated for the packet call fixed routing to the processor that processes the call according to the resource allotment request; and performing, at the processor that processes the call, the call setup using the allotted resource.

14. The method of claim 13, wherein, if the number of the mobile terminal is not identical with the number of the mobile terminal designated for the packet call fixed routing then performing the call setup further comprises:

requesting the processor that administrates the resource to allot a resource for a basic call setup by paging interface for the basic call setup; and allotting, at the processor that administrates the resource, the resource for the basic call setup according to the resource allotment request and transmitting the resource for the basic call setup to the processor that processes the call.

15. The method of claim 8, further comprising:

releasing the setup packet call and the setup of the mobile terminal number designated for the packet call fixed routing, wherein said releasing is performed if a release of the setup packet call is requested.

* * * * *